United States Patent
Monen et al.

(10) Patent No.: US 7,814,395 B2
(45) Date of Patent: Oct. 12, 2010

(54) REWRITE STRATEGY AND METHODS AND SYSTEMS FOR ERROR CORRECTION IN HIGH-DENSITY RECORDING

(75) Inventors: Marinus J. Monen, Stow, MA (US); Maarten R. de Haan, Newton, MA (US)

(73) Assignee: Opternity Storage, Inc., Cambridge, MA (US)

( * ) Notice: Subject to any disclaimer, the term of this patent is extended or adjusted under 35 U.S.C. 154(b) by 984 days.

(21) Appl. No.: 11/565,991

(22) Filed: Dec. 1, 2006

(65) Prior Publication Data

US 2007/0150793 A1 Jun. 28, 2007

Related U.S. Application Data

(60) Provisional application No. 60/741,634, filed on Dec. 2, 2005.

(51) Int. Cl.
*G11C 29/00* (2006.01)
(52) U.S. Cl. .................................................. 714/763
(58) Field of Classification Search ................. 714/746, 714/763–764, 771, 769; 369/47.18
See application file for complete search history.

(56) References Cited

U.S. PATENT DOCUMENTS

| 4,486,881 | A | 12/1984 | de Couasnon |
| 5,963,522 | A | 10/1999 | Yamamuro |
| 6,043,945 | A | 3/2000 | Tsuboi et al. |
| 6,141,312 | A * | 10/2000 | Masters et al. ................ 369/97 |
| 6,163,428 | A | 12/2000 | Okuyama |
| 6,631,492 | B2 | 10/2003 | Marchant |
| 6,958,873 | B2 | 10/2005 | Sved |
| 6,996,766 | B2 | 2/2006 | Cypher |
| 7,036,012 | B2 | 4/2006 | Charrin |
| 7,079,346 | B2 | 7/2006 | Jerman |
| 7,266,736 | B2 | 9/2007 | Ko |
| 7,322,002 | B2 * | 1/2008 | Keays et al. ................. 714/763 |
| 7,529,784 | B2 | 5/2009 | Kavuri et al. |
| 2005/0180459 | A1 | 8/2005 | Watson |
| 2007/0094569 | A1* | 4/2007 | Thayer et al. ................ 714/763 |

OTHER PUBLICATIONS

ISR for PCT/US06/61496, Feb. 25, 2008, Opternity Storage, Inc.

* cited by examiner

*Primary Examiner*—Shelly A Chase
(74) *Attorney, Agent, or Firm*—Burns & Levinson LLP; Orlando Lopez

(57) ABSTRACT

Strategy and methodology by which the various error sources are taken into account and methods applied to compensate substantially entirely for such errors and/or diminish the effect of such errors.

11 Claims, 7 Drawing Sheets

REWRITE STRATEGY AND METHODS AND SYSTEMS FOR ERROR CORRECTION IN HIGH-DENSITY RECORDING

CROSS REFERENCE TO RELATED APPLICATIONS

This application claims priority of U.S. Provisional Application 60/741,634 entitled "REWRITE STRATEGY AND ERROR CORRECTION SYSTEM FOR HIGH-DENSITY OPTICAL RECORDING," filed on Dec. 2, 2005, which is incorporated by reference herein.

BACKGROUND

These teachings relate to the recording of data on storage media such as, but not limited to, optical tape used for high-density data or information storage. The user data to be recorded on such medium need to be protected in the best possible manner against write and/or read defects as well as possible aging defects of the recording medium.

In particular these teachings relate to the strategy and methodology by which the various error sources are taken into account and efficient methods are applied to compensate substantially entirely for such errors and/or diminish the probabilities of those errors to propagate into the read-back user data. Reference is made to U.S. patent application Ser. Nos. 11/504,754 and 11/551,396, both of which are incorporated by reference herein, for a general understanding of an optical tape recording system. In the optical tape system described in the above references data are recorded by a modulated laser beam that moves in the longitudinal direction of the tape along paths of "virtual tracks" that also contain precise coordinate information with respect to the particular track numbers and particular block numbers where a specific recording or reading action is to take place. Reference is also made to the conventional art of adding error correction capability to the user data before recording, such that errors in the read-back data stream can be corrected. (A more detailed description of such conventional art of adding error correction capability is given below.) Typically user data and error correction data are intermingled and interleaved in order to randomize the effect of isolated "drop-out" events along the tracks resulting in error bursts and thus maximizing the correction capability of the particular error correction code deployed. Depending on the chosen length of the error correction codewords and depending on the chosen depth of interleaving of these codewords, a minimum block size of data results that will need to be written to a track in a single recording action. Increasing burst error correction power requires increasing block sizes of uninterrupted recording. In addition performing start and stop actions of the tape at the beginning and ending of each data block is highly undesirable for reasons of throughput (sustainable data rates) and for reasons of unwanted wear-and-tear of the tape transport mechanism and tape itself. Thus, there is a need for a "streamer mode" operation where recording and reading of data takes places during one single pass of the tape.

It is also desirable that a verification step takes places immediately after recording of data to detect any data that is not read back correctly. Based on the so detected errors a decision can be made to immediately rewrite part or all of the detected errors to a different part of the tape. Such process will ensure that the majority, or in the limit all, of the original data that was subject to a recording request is present without any read-back failures at the time this initial recording session took place. This will ensure that the majority, or in the limit the entirety, of the error correction capacity will be reserved for read errors that may occur in the future as a result of aging errors in the recording layer of the tape or the result of variations in the read heads (for example if the tape is read in the future with a different head than was used for the recording).

In the case of optical tape, it is therefore a need to provide a method that allows uninterrupted "single-pass" recording of long segments of single tracks, representing one or more blocks of protected data. One track would be divided into several data blocks as shown in FIG. 1. In the limit one block could be chosen to equal one entire track over the full length of the tape. It is a further need to be able to verify the correctness of each recorded block immediately by performing a read verification process either during the same recording pass or during a separate single-pass verification of the just recorded block. If errors are detected during this verification process, it will then be necessary to rewrite all or part of those data segments that have failed at another location in order to ensure that most or all original data is available without the need for any correction at that time, thus leaving the full error correction power for any read-back variations at future times. The rewritten data that is recorded at another location will need to be protected as well and therefore it is typically recorded subject to the same error correction methodology as used for the original data. For smaller block sizes it has therefore been a practice to re-write any blocks in their entirety once the errors detected during the verification step are exceeding a certain threshold. In case of larger blocks (in the limit: one entire track) this will quickly become an unwieldy process, creating extreme inefficiency in terms of data throughput and extra space required.

Therefore, in summary there is a need for a rewrite system and methodology that does not require to re-record an entire block or an entire codeword, but instead deploys a simple method to ensure substantially no read errors at the time of the initial recording session by capturing, storing and rewriting only those meaningful subsegments of a data block where verification errors were detected, thus saving significant data space, while at the same time the rewritten subsegments are protected by the same error correction system as used for the original data. There is also a need that the rewrite system maintains a full uninterrupted "streamer mode" operation for the recording and read-back of each (large) data block, thus preventing serious degradation of data throughput rates. In the limit of one block per track this methodology needs to allow single pass recording, verification and read-back of a full track length.

For reference, a description is provided below of the conventional practice of forming error correction codewords and the practice of writing data in an interleaved manner to the tape media. For the purpose of the error correction system the bit stream of incoming user data is segmented into symbols of x bits each with $x \geq 2$. Frequently a symbol is chosen to contain 8 bits (one byte). As shown in FIG. 2, one symbol is graphically represented as a square cell, and the original user data is fed into a memory in preparation of an initial recording session. The full memory block is laid out as a rectangular field of symbols. One part of the memory on the left (in yellow) is reserved to store the user data. Another part of the memory on the right (in blue) is reserved for error correction data that is to be added. User symbols are fed into the block memory in a horizontal sequential mode as indicated by the arrows in FIG. 2. After the first row of user data has been stored, an unique calculation is performed by the error correction encoder to generate a certain number (n) of error correction symbols that are then also stored in the first row of the block, thus forming the first codeword. Typically Reed- Solomon codes are used for the formation of such codewords. The characteristic of such Reed-Solomon codewords is that it forms a new data set where the distinction between original user data and added error correction data becomes irrelevant. In case n is chosen to be an even number, the so constructed codeword has the key property that upon decoding it can detect and correct n/2 symbol errors. The symbol errors may occur at any location in the codeword. Another characteristic of such Reed-Solomon codewords is that their maximum length (in number of symbols) is given by $(2^x-1)$, where x is again the number of bits per symbol. In the same manner all k codewords are constructed as defined by the block size.

After completion of a full data block stored in a temporary memory as shown in FIG. 2, the data are written to the track in a different order than the order in which the original user data were received. As shown in FIG. 3 by the direction of the arrows, data symbols are recorded in the track by taking them in a vertical direction from the temporary block memory. This process will result in an interleaving of the symbols of all codewords. If there are k codewords in a block, then the interleave depth is also k, and the distance of any two subsequent symbols in any given horizontal codeword is such that they will be separated by (k–1) symbols belonging to other codewords.

The process of interleaving is generally deployed to mitigate the effects of large "dropouts" in a recorded track by breaking these up into symbol errors that are distributed over several codewords. To illustrate this process, three segments of errors are depicted by the areas labeled 655 as shown in FIG. 3. Each corresponds to a contiguous segment of the track where errors are occurring upon read-back due for example to imperfections in the recording layer of the medium. After read-back and refilling of a second temporary memory block, identical to the one represented in FIG. 3, all codewords can be corrected that do not contain more than n/2 symbol errors (for n=even). For example if n=20 and k=500, then a block that would contain only one contiguous burst error of 10×500=5000 symbols and no other errors, could still be fully corrected.

As an example, if x=8 and n=20, codewords will have a maximum length of 255 bytes, composed of 235 user bytes and 20 error correction bytes. This would equip each codeword with an inherent correction ability of a maximum of 10 defective bytes regardless at which position these would occur in the codeword. Beyond 10 bytes in error the codeword would not be correctable. As a further example assume that we would require that a single error burst of 10 centimeter physical length on the tape must be correctable and let us also assume that the linear recording density is one byte per 2 um (this is the approximate linear density of a DVD recording). Then 10 centimeter length of a track segment would contain 50,000 (100,000/2) bytes. With codewords having a capability to correct 10 bytes, the data block will need to have 5,000 (50,000/10) codewords in order to achieve the desired interleave depth (k=5,000 in FIGS. 2 and 3). This means that one block contains 235×5,000=1,175,000 bytes of user data (1.175 MB) and the total size of the data block to be recorded is 1.275 MB. This is equivalent to a length of 2.55 meters for one data block. On a tape of 500 meters length there would thus be approx 196 blocks per track in this example.

BRIEF SUMMARY

One embodiment of these teachings describe the process of verification of (large) data blocks that are freshly recorded using a standard error correction and interleaving scheme, followed by the detection of erroneous subsegments of such blocks, and finally storing a selection of such subsegments by rewriting them. Some characteristics of some embodiments of the methodology of these teachings are that the rewritten subsegments are protected by the same error correction scheme as deployed for user data blocks, that the initial recording and/or verification of each block is not interrupted, that the block length can be chosen to be equal to a full track on the tape, that the rewritten subsegments while limited in size represent exchangeable subsegments of the original data block, and that the reinsertion of the rewritten data into the data blocks allows for uninterrupted error-free detection of the original user data without invoking the full power of the error correction system at the time of the initial recording and verification session.

As a result, there will be an advantage in required additional storage space for the rewritten data as opposed to the recording of entire data blocks or codewords that contain errors, which is specifically important for large blocks or codewords, and there will be an advantage in the ability to maintain data throughput speeds. Data blocks can be chosen to be as large as one entire track over the full length of the tape.

An embodiment the methodology of these teachings allows the preservation of the full error correction capability to be applied only for those errors that may arise at a later time of read-back.

For a better understanding of these teachings, together with other and further objects thereof, reference is made to the accompanying drawings and detailed description and its scope will be pointed out in the appended claims.

BRIEF DESCRIPTION OF TILE DRAWINGS

DETAILED DESCRIPTION

In one embodiment, the methods and systems of these teachings can construct a reliable verification and rewrite process at the moment of initial recording of user data, which does not require the wholesale repetition of entire data blocks or entire codewords that contain one or more errors upon verification.

One embodiment of the methods and systems of these teachings can preserve a substantial part, if not all, of the capacity of the error correction system for any errors that may occur over the lifetime of the recorded data as opposed to any errors that are already present at the initial time of recording. To this end a verification of just recorded data is performed on each data block that has been recorded. Such a verification may be performed by a read-back head that trails the recording head, thus allowing to perform a complete verification in the same pass as the recording with only a small time delay, or to verify the just recorded block by a separate pass of the read-back head in forward or in reversed read direction.

Figure 1:
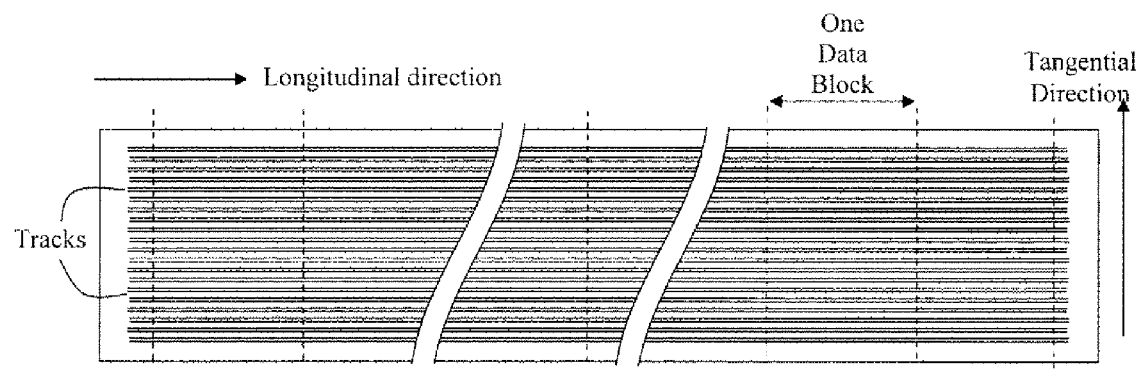
FIG. 1 is a plan view of an optical tape segment showing the longitudinal and tangential direction of the tape.
Figure 2:
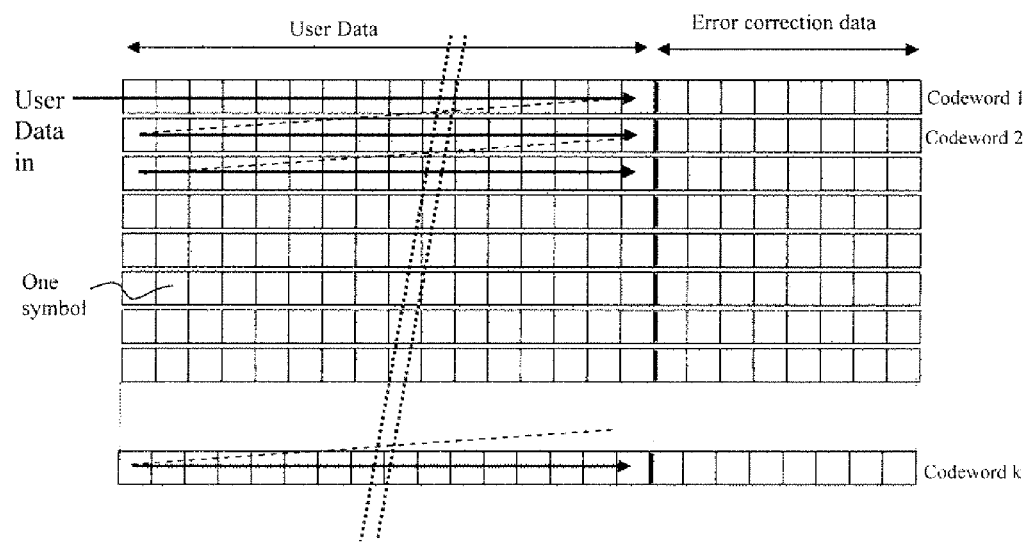
FIG. 2 represents a typical data block, consisting of codewords that contain both user data and error correction data.
Figure 3:
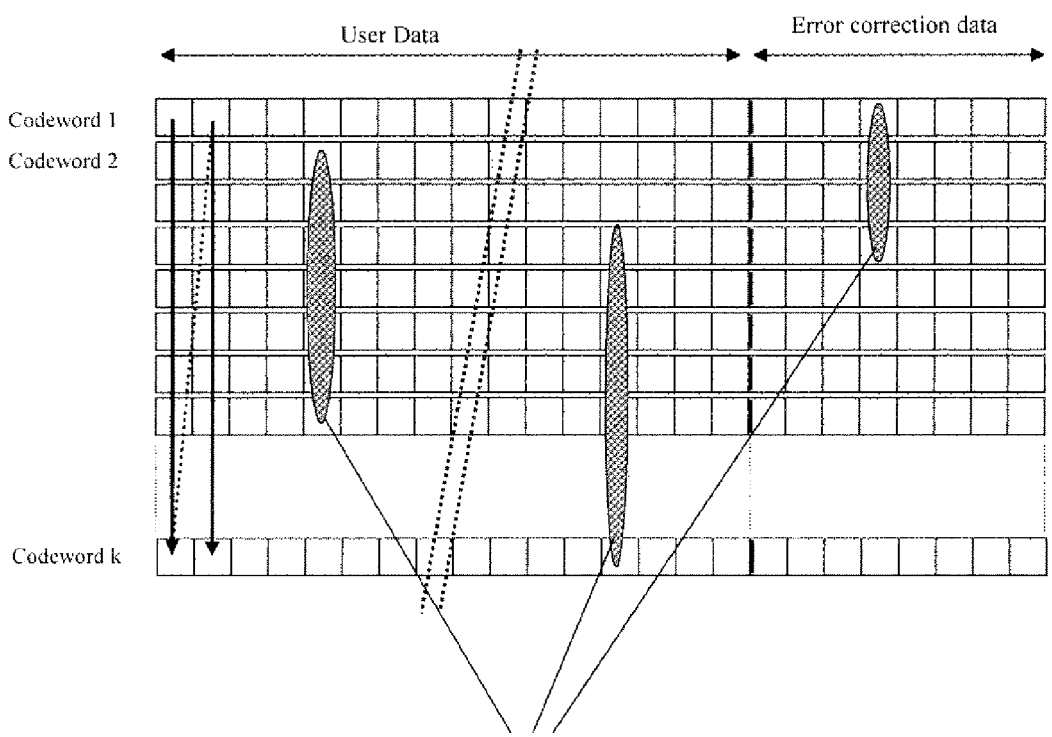
FIG. 3 represents a typical configuration of interleaving these codewords and shows the order of writing data to the tape track.
Figure 4:
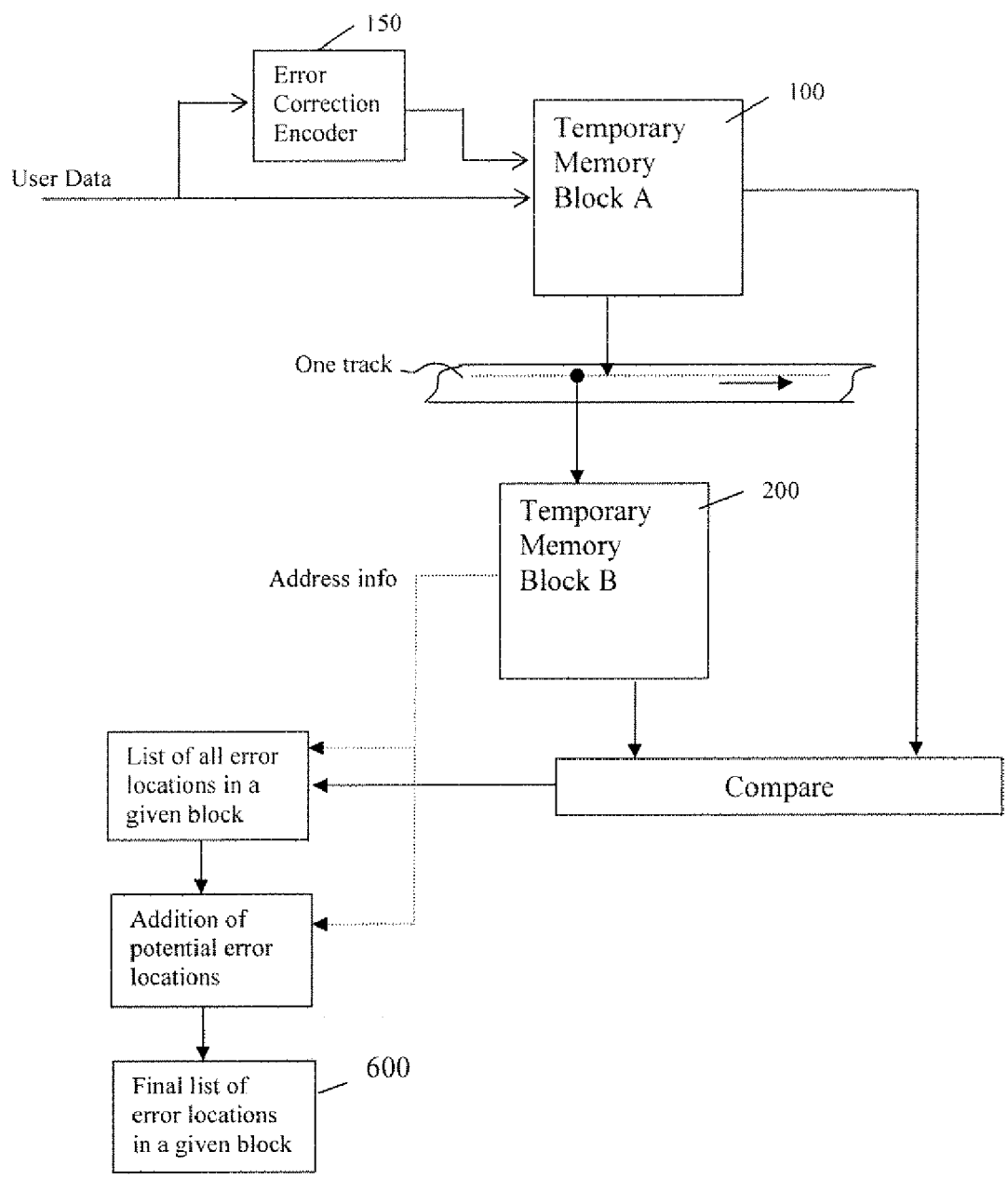
FIG. 4 is a graphical schematic representation of an embodiment of the recording and verification process and system of these teachings.

After verification the re ad-back data are stored in a temporary block memory 200, while the data to be recorded are still present in temporary memory block 100, as shown in FIG. 4. The layout of both memory blocks is identical to the layout shown in FIG. 3. The data from memory block 100 and memory block 200 are then compared on a symbol-by-symbol basis. If any discrepancies are found a list is generated of all symbol locations that are in error. In one embodiment, the verification process can also be done in a "running mode" where each read-back symbol is directly compared to its intended value stored in memory block A, thus obviating the need for memory block B. The comparison is made for all symbols in a block, including the original user data and the added error correction data that are generated by encoder 150.

The list of error locations is based on an addressing format that allows to uniquely determine the location of each symbol in a data block. Such addressing format contains a track number, a data block number (reference is made, although these teachings are not limited only to this format, for the generation and encoding of these track and block numbers to U.S. patent application Ser. No. 11/551,396, "Methods and Systems for Providing Data Track Identifying Information on a Recording Medium"), a codeword number and a symbol number. Referring to the previous example, these teachings not been limited to only this example, the codeword numbers would range from 1 to 5,000 and the symbol numbers would range from 1 to 255. The address length required to identify every single data symbol in such a block would thus be $^2\log(5000 \times 255)$=approx. 20 bits)

An additional feature of some instances of the above embodiment is that the so constructed list of error locations may be augmented with additional addresses that correspond to the beginning or ending of any error locations found by the comparison step. For example, in one instance, the algorithm could be set to declare each two symbols preceding and each two symbols trailing a contiguous string of erroneous symbols on a track to be declared in error as well, in spite of the fact that these symbols were found to be correct in the verification step. The effect of such augmentation of the symbol error list would be to provide extra safeguards at the beginning and end of each dropout, so that possible misdetection in the future at the boundaries of these error regions is anticipated. Another possible selection could be to declare all symbols in error that belong to the same codeword where at least one error was detected in the comparison step. Yet another possible selection is to allow certain single, or small multiple, symbol errors to pass and only rewrite those symbol errors exceeding a certain preset criterion.

Figure 5:
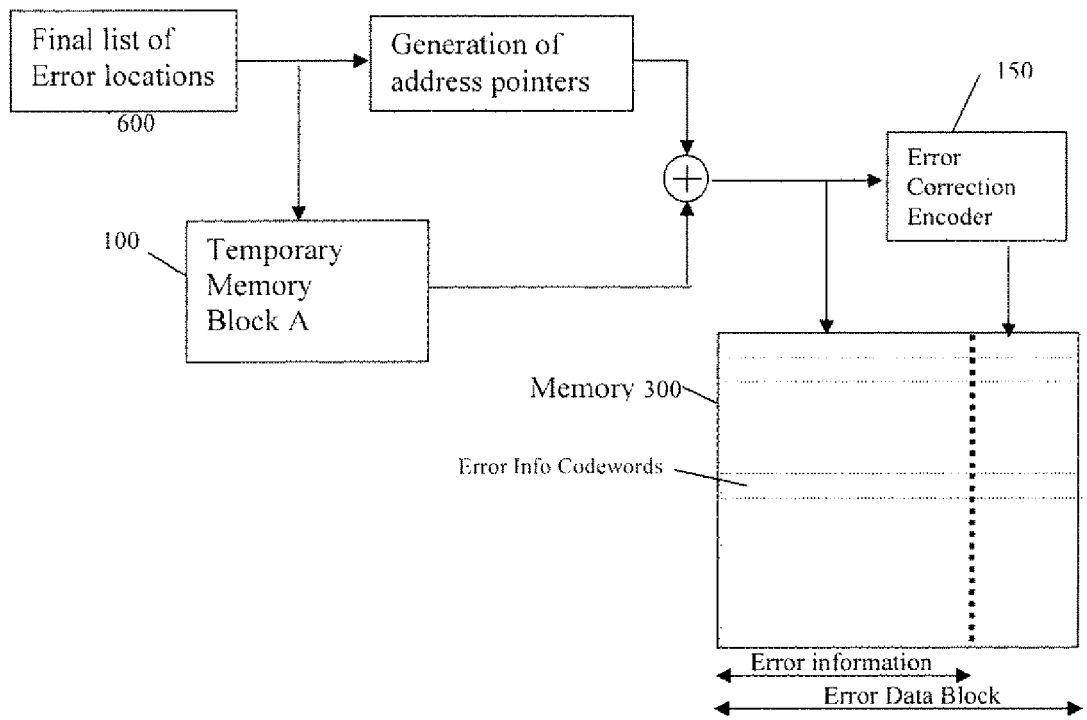
FIG. 5 is a graphical schematic representation of a portion of another embodiment of the recording and verification process and system of these teachings.

The next step is to use the so constructed final list of error locations (600) to retrieve the corresponding correct values for each symbol location from memory block A (100) and store these together with their location addresses in a memory 300 as shown in FIG. 5. The combined list of error locations and their correct symbol values is defined as "error information". There are many different ways to obtain efficiencies of storage of the associated address information. For example, these teachings not been limited only to this example, one can use offset pointers from one string of error locations to the next string of error locations which would generally save address space required especially in the presence of many longer dropouts.

In an embodiment of these teachings, the combined error information so obtained is in turn protected by the same error correction scheme as used for regular data blocks. To that end the error information is presented also to the error correction encoder 150 that generates supplemental error correction symbols that are added to memory 300 in FIG. 5. Thus memory 300 will contain protected codewords where the combination of error location and correct data symbol values for these locations are treated as new user data. These new codewords are defined as "error information codewords."

FIG. 5 shows this operation for the error information derived from the verification step of one recorded data block. If a recording session is comprised of writing several data blocks to the medium (i.e. tape), then the operation shown in FIG. 5 is repeated for each block and the resulting error information from each block is added each time to memory 300, filling memory 300 gradually with subsequent error information codewords.

The tape medium considered in an embodiment in these teachings is normally contained in a tape cartridge. When a tape cartridge is loaded into a tape drive mechanism for a recording session, it is possible to establish an electrical connection between the cartridge and the drive mechanism that performs the read/write actions. (The electrical connection can be obtained by noncontact means as in U.S. Pat. No. 7,106,250, incorporated by reference herein, or a conventional electrical connector as in U.S. Pat. No. 7,079,346, which is also incorporated by reference herein.) In one embodiment, such cartridge can be equipped with a solid-state memory chip (for example non-volatile flash memory), embedded within the cartridge, which can serve the purpose of memory 300. The capacity of such solid-state memory 300 can be selected to be any size. For example it can be selected to be equal to the size of a user data block as defined in a particular product configuration or it can be a subset or a superset of this. Typically the size of an error data block would be selected to be able to contain at least one data block, thus ensuring that a data error block would at least benefit from the same level of (burst) error correction as applied to the regular data blocks.

Figure 6:
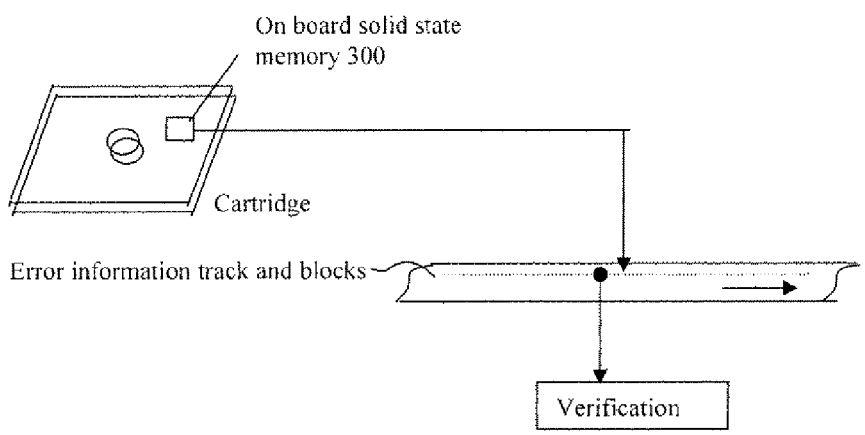
FIG. 6 is a graphical schematic representation of a component of an embodiment of a data storage system of these teachings.

When the solid-state memory 300 has reached the full capacity of a defined error data block, the drive will initiate a write action by clearing this error data block from the solid-state memory 300 and record it to a special reserved track on the tape as shown in FIG. 6. This will allow subsequent error information to be accumulated in solid-state memory 300.

In an embodiment of these teachings, the entirety of the error information, so recorded, is protected by the same error correction system as used for the user data. After an error data block is written to a special assigned track, it will also be made subject to the same verification procedure. In case verification errors are found these can be captured and processed in the same manner as described for the user data, which will then lead to the writing of a subsequent error data block. This process can be repeated until there is no residual error information remaining. The error information so recorded will benefit from the same protection and interleaving as the original user data.

It is also possible that the solid-state memory 300 has sufficient capacity to contain all error information codewords generated at the end of the last recording session. In that case all error information codewords will be available both from the solid-state memory 300 as well as from the read-back of the specially assigned tracks that contain the error data blocks, which will provide an additional safeguard against recorded error information codewords that turn out to be uncorrectable.

Figure 7:
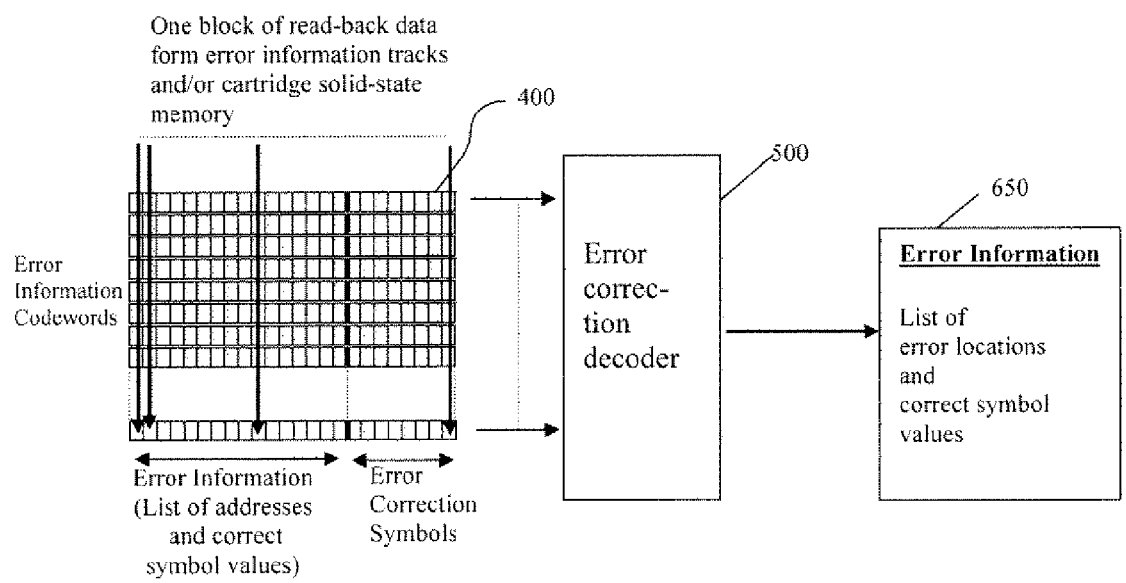
FIG. 7 depicts a graphical schematic presentation of another portion of an embodiment of the recording and verification process and system of these teachings.

At the start of a read-back session of user data that were previously recorded with the embodiment of the process and system of these teachings described above, the first operation to take place, after loading of the cartridge in the tape drive mechanism, is to read out either the special track or the solid-state memory on the cartridge that contains the accumulated error information related to all prior recording sessions for this cartridge. All error data blocks will be read back and then stored, either in their entirety or partly, in a number of memory blocks 400, as shown in FIG. 7. The read-back data is loaded into the memory block as represented in FIG. 7 in a vertical manner. Once all symbols belonging to the interleaved horizontal codewords of an error data block are read back, the error correction operation is performed for each codeword by the error correction decoder 500, thus generating corrected error information data 650, that is identical to the error information shown in FIG. 5, comprised of the combination of the final list 600 of error locations with their associated correct symbol values for these locations.

Figure 8:
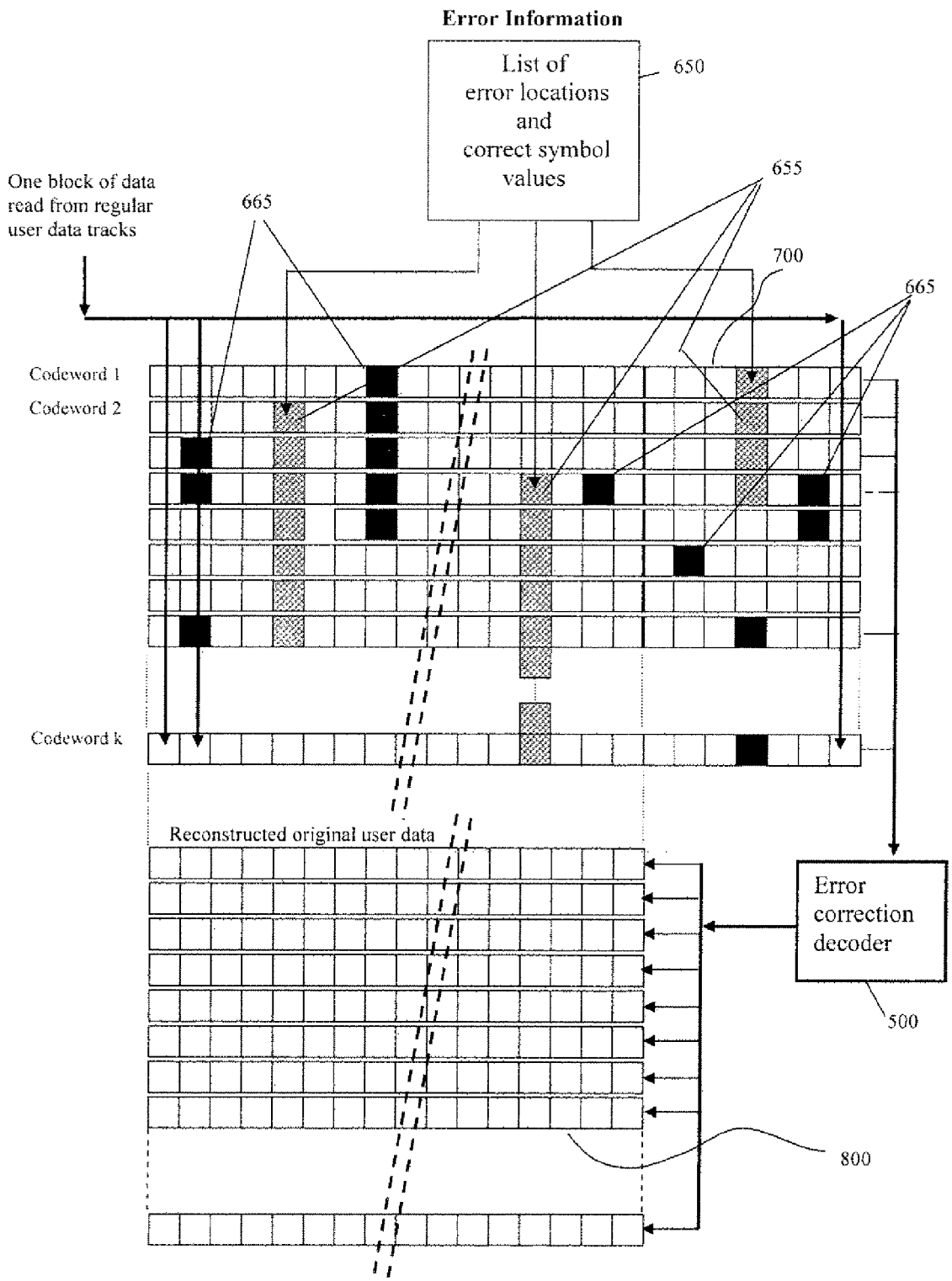
FIG. 8 depicts a graphical schematic presentation of yet another portion of an embodiment of the recording and verification process and system of these teachings.

The final operation in the above embodiment where the user data blocks are being read back from the tape medium is depicted in FIG. 8. First the data symbols read from the tracks are loaded into a memory block 700 in a vertical manner. This data will contain three categories of errors: a) "time-zero" errors that were detected at the time of initial recording and were subject to a rewrite action at that time, b) "time-zero" errors that were detected at the time of initial recording and were exempted by choice from the rewrite action at that time and c) "aging" errors that have arisen at any time after initial recording. Secondly the error information 650, containing the category (a) error locations and associated correct symbol values, is used to load these correct values into their corresponding symbol cells, as indicated by the cells 655 in FIG. 8. In this example the locations of the cells 655 correspond exactly to the areas were dropouts or defects were detected as category (a) "time-zero" errors by the verification process at initial recording, as depicted in FIG. 3. The net effect of inserting the correct values at the error locations from the error information 650 is that all category (a) "time-zero" defects are cancelled before the codewords of the so loaded memory block 700 are presented to the error correction decoder 500. In case no errors are present in a codeword the error correction decoder will be able to confirm the absence or symbol errors performing a very fast check and will not have to perform a more complex correction operation, which could consume significantly more processing time. Only in case category (c) "aging" errors and/or category (b) "time-zero" errors are present, as indicated by the symbol cells 665 in data block 700, does the error correction decoder 500 have to perform a correction operation. Therefore the full error correction capability of the recording system is reserved substantially for category (c) "aging errors" with some correction capacity reserved for the correction of category (b) "time-zero" errors, if so selected. After correction, the original user data are delivered into memory 800 for retrieval by the host interface to which the tape drive is connected.

Another aspect of the above described embodiment of the teachings is that this rewrite methodology allows for maintaining the throughput rates in "streamer mode" both during the recording and the read-back of the data blocks. Efficiency upon read-back stems from the fact that error correction is only invoked in those instances that category (c) "aging" errors and/or category b) "time-zero" errors are detected.

The methodology of the above embodiment allows for various sizes of data blocks. It is also possible to define different sizes for the user data blocks as opposed to the error data blocks without changing the fundamental process described.

The construction of the error location list is very efficient especially when an immediate read-after-write verification step is performed during the same recording pass. The error information data to be stored in the list of error locations and associated symbol values is very compact and does not require much space for storing all error information pertaining to multiple blocks of user data.

Figure 9:
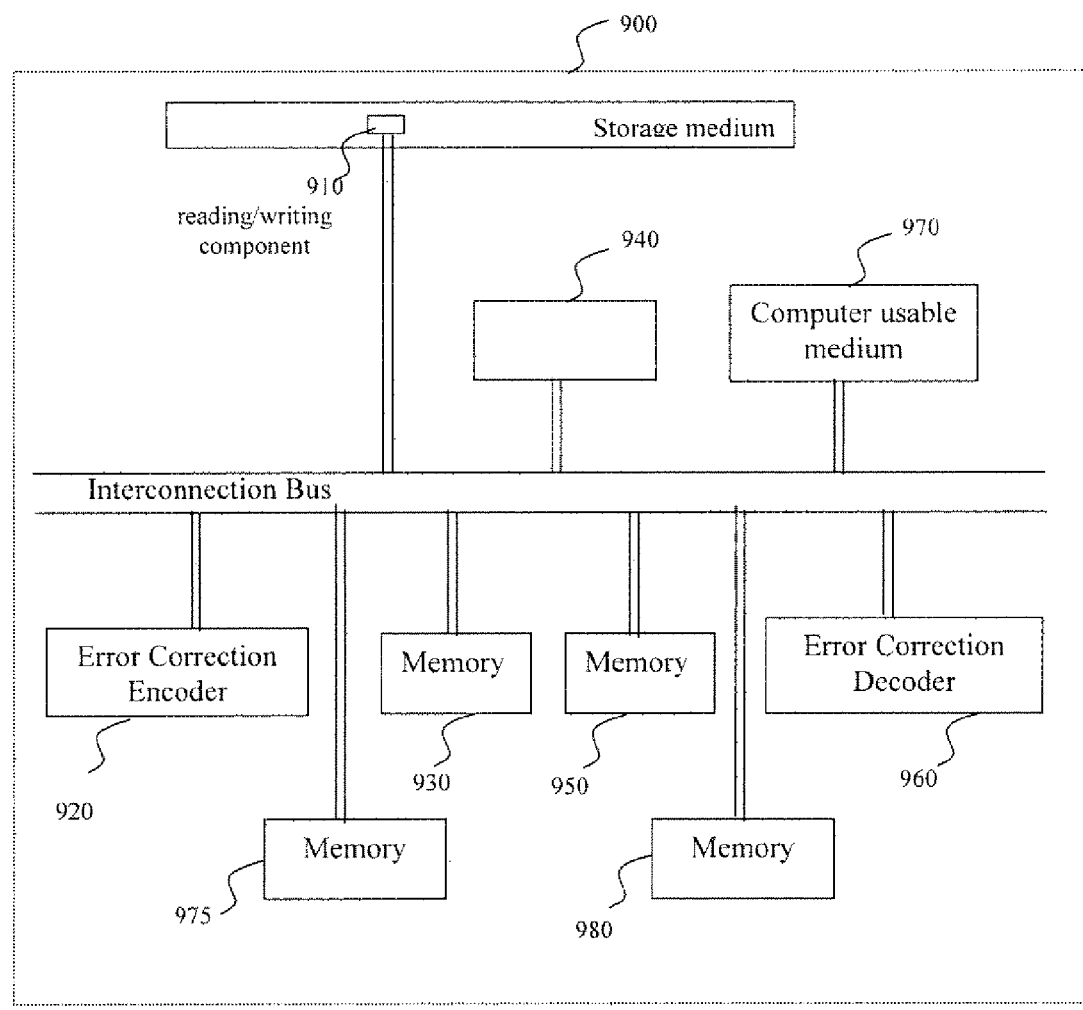
FIG. 9 shows a particular embodiment of the system implementation according to these teachings.

One embodiment of the system of these teachings 900 shown in FIG. 9, includes one or more components capable of retrieving stored data 910 (such as, but not limited to, the read head or read/write head in an optical tape), one or more processors 940, an error correction encoding component 920 capable of providing error correction data corresponding to input data (the error correction encoding component may be implemented in hardware, such as dedicated hardware or a programmable logic array, or in software or in a combination of the two), a first computer usable memory 930 (such as the memory 100 in FIG. 4), a second computer usable memory 950 (such as the memory 700 in FIG. 8), an error correction decoding component 960 (the error correction decoding component may be implemented in hardware, such as dedicated hardware or a programmable logic array, or in software or in a combination of the two), and a computer usable medium 970 having computer readable code embodied therein, the computer readable code being capable of causing the one or more processors to implement the methods described herein above. From the methods described above, it should be noted that embodiments of the system of these teachings including more than two memories are also possible (shown as memories 975 and 980 in FIG. 9).

To illustrate the power of the rewrite strategy according to these teachings, a numerical comparison is made between the rewriting of each error symbol, as described in these teachings, and the rewriting of each codeword that contains one or more symbol errors. For this example we assume that we have recorded and verified a total data stream of 10,000 blocks, each containing 5000 codewords, representing a total of 50 million codewords and have found, upon verification, a total of 8.8 million symbols in error, distributed over errors burst that are all less than 50,000 symbols long. We further assume that x=8 (one symbol=one byte), one codeword has N=255 symbols, codewords can correct up to 10 symbols in error (n=20), and the interleave depth k=5,000. Since no bursts longer than 50,000 symbols are encountered, the effect of the interleaving operation can be considered to distribute all error symbols across all horizontal codewords in a random manner. The error probability S for any single symbol is then 8.8 million divided by the total number of symbols in the set of 10,000 blocks (50 million×255). This results in S=6.9×10$^{-4}$.

With this we can calculate the probability C that a codeword will contain one or more errors:

$$C_{(p \geq 1)} = \text{SUM}_{\{p=1,N\}}[N!/[p! \times (N-p)!] \times S^p \times (1-S)^{(N-p)}],$$
with p=the number of symbol errors per codeword, and
N=255 the number of symbols per codeword.

This results in $C_{(p \geq 1)}$=16.14×10$^{-2}$. The number of codewords that have one or more errors in the set of 10,000 verified data blocks (containing 50 million codewords) is then:

$C_{(p\geq1)}\times50$ million=8.07 million codewords. If we would rewrite all codewords with at least one symbol error in their entirety, then this would require a rewrite action of 255× 8.07=2,058 million symbols (bytes). In order to rewrite these codewords in error it is also necessary for each codeword to be accompanied by an address containing track, block and codeword numbers. In case we select to only rewrite those codewords that contain 2 or more symbol errors (and thus leaving the category of codewords that contain only one symbol error for later correction at read-out) then $C_{(p\geq2)}=1.37\times10^{-2}$, and in that case we would have 685 thousand codewords to be rewritten, which equals 174.7 million symbols.

Comparing these two cases with the strategy, as described in these teachings, where each single error symbol is rewritten, then 8.8 million error symbols must be rewritten. These will also have to be addressed. Track, block and codewords addresses will be the same as for the rewriting of entire codewords, but an extra address is required for the location within each codeword (1-255). This will require an extra address byte ($2^8=256$) for each error symbol. Thus the rewrite operation will then require a total of 8.8 million error symbols plus 8.8 million extra address bytes: a total of 17.6 million symbols (bytes). For the assumptions used in this example this rewrite strategy is thus 9.9×(174.7/17.6) times more efficient than a strategy to rewrite all codewords that contain two or more symbol errors, and 117×(2,058/17.6) times more efficient than a strategy to rewrite all codewords that contain at least one symbol error.

In addition to the advantage of required storage space for rewritten data, the reliability of this rewrite system is also enhanced for any given capacity of a selected error correction system, due to the facts that:
  a. The error information itself is protected as a minimum in the same manner as the user data. Additional protection can be obtained by recording the error information twice or by redundant storage in a non-volatile solid-state memory incorporated in the tape cartridge.
  b. Category (a) "time-zero" errors do not burden the error correction capability upon read back, thus allowing for significant gain in processing speed upon read back, while reserving the full (burst) error correction capacity for category (c) aging errors and, if so selected, for certain category (b) "time-zero" defects.
  c. The verification process can be set with criteria that are on purpose more severe than the margins of the nominal read-back operation. This can be in the form of extra "guard bands" of error symbols at the boundaries of longer defects or drop-outs or in the form of reduced threshold settings in the verification read-back. Both would lead to an increase of the error list, but would have as effect to provide an extra margin of protection against anticipated variations in the media or the read mechanisms that are the result of interchangeability requirements.

At the same time the verification process criteria can also be set to exempt certain error patterns from the rewrite process creating the category (b) 'time-zero' errors. This does not preclude the simultaneous application of more severe criteria as described in the preceding paragraph.

In summary some of the advantages of the teachings lie in the fact that a reliable error protection capability is obtained using a special rewrite strategy that allows to obtain reductions in both the rewrite rates at the moment of initial recording and in the read error rates at read-back of data at a later time. In addition, these teachings allow for improvements of the write and read performance throughput rates by making it possible to create uninterrupted modes of recording and readback of all tracks addressed in one pass of the full tape length.

It should be noted that although the embodiments described above are described in terms of optical tape as the recording medium, this is not a limitation of these teachings. Other embodiments with other recording media are possible and within the scope of these teachings.

Elements and components described herein may be further divided into additional components or joined together to form fewer components for performing the same functions.

Each computer program (code) within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the teachings may be performed by a computer processor executing a program tangibly embodied on a computer-readable medium to perform functions of the teachings by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, or any other medium from which a computer can read. Use of information transmission over a network, such as the Internet, in which a computer readable code is embodied, renders such information transmission encoded signals equivalent to a computer usable medium.

These teachings have been described with respect to various embodiments, it should be realized these teachings are also capable of a wide variety of further and other embodiments within the spirit and scope of the appended claims.

What is claimed is:

1. A method for correcting errors in a data recording system, the method comprising the steps of:
  recording user data and error correction data responding to the user data;
  reading, after recording, the recorded user data and error correction data;
  determining, from the user data and error correction data and the read recorded user data and error correction data, a list of locations of error;
  determining, for each error location in the list of locations of error, a corresponding correct datum from the user data and error correction data, a plurality of locations of error and corresponding correct datum for each location from the plurality of locations of error constituting error data;
  storing the error data;
  obtaining, at readback, recorded user data and error correction data;
  replacing, after readback, at each one location from predetermined ones of the list of locations of error, the obtained recorded user data and error correction data with the correct datum corresponding to said one location from the predetermined ones;
  wherein, after replacing, corrected retrieved user data and error correction data is obtained.

2. The method of claim 1 further comprising the steps of:
  obtaining error correction data corresponding to the error data;

wherein the step of storing the error data comprises the step of storing the error data and the error correction data corresponding to the error data;

decoding, at readback, using an error correction decoder, corrected error data from the error data and the error correction data corresponding to the error data;

whereby an error correction capability is applied to the error data

3. The method of claim 1 wherein the step of determining, from the user data and error correction data and the read recorded user data and error correction data, the list of locations of error comprises the steps of:

declaring a predetermined number of symbols preceding and a predetermined number of symbols trailing a contiguous group of read recorded user data and error correction data, having been determined to be in error, as being in error;

determining locations of the predetermined number of symbols preceding and a predetermined number of symbols trailing; and including the determined locations in the list of locations of error.

4. The method of claim 1 wherein the step of storing the error data comprises the step of utilizing offset pointers from one string of error locations to a next string of error locations.

5. A system for correcting errors in a data recording system, the system comprising:

at least one processor;
a first computer usable memory;
a second computer usable memory; and
a computer usable medium having computer readable code embodied therein, said computer readable code being capable of causing said at least one processor to:

store user data and error correction data corresponding to the user data in the first computer usable memory;

record, on a recording medium, user data and error correction data responding to the user data;

read, after recording, the recorded user data and error correction data;

compare the read recorded user data and error correction data to the user data and the error correction data stored in the first computer usable memory;

determine, from the comparison, a list of locations of error;

determine, for each error location in the list of error locations, a corresponding correct datum from the user data and error correction data stored in the first computer usable memory, a plurality of locations of error and corresponding correction data constituting error data;

store the error data in the second computer usable memory;

replacing, after readback, at each one location from predetermined ones of the list of locations of error, the read recorded user data and error correction data with the correct datum corresponding to said one location from the predetermined ones;

wherein, after replacing, corrected retrieved user data and error correction data is obtained.

6. The system of claim 5 wherein said computer usable medium is further capable of causing said at least one processor to:

obtain error correction data corresponding to the error data;

wherein said computer usable medium in causing said at least one processor to store the error data causes said at least one processor to store the error data and the error correction data corresponding to the error data; and decode, at readback, using an error correction decoder, corrected error data from the error data and the error correction data corresponding to the error data.

7. The system of claim 5 wherein said computer usable medium in causing said at least one processor to store the error data further causes said at least one processor to utilize offset pointers from one string of error locations to a next string of error locations.

8. The system of claim 5 wherein said computer usable medium is further capable of causing said at least one processor to:

determine whether said second computer usable memory has substantially reached full capacity for a predetermined error data block;

record, if said second computer usable memory has substantially reached full capacity for a predetermined error data block, said predetermined error data block to a predetermined location in a recording medium; and clear said predetermined error or data block from said second computer usable memory.

9. A data storage apparatus comprising:

a tape cartridge comprising:

a computer usable memory for storing data for access by a computer usable code being executed by a processing system, said computer usable memory comprising:

a data structure stored in said computer usable memory, said data structure comprising:

a list of locations of errors; and for each location of error in the list of locations or error, a corresponding correct datum from user data and error correction data; and means for operatively connecting said computer usable memory to said processing system; and a processing system comprising:

at least one processor;

another computer usable memory;

a computer usable medium having computer readable code embodied therein, said computer readable code being capable of causing said at least one processor to:

store the user data and the error correction data corresponding to the user data in said another computer usable memory;

record user data and error correction data responding to the user data;

read, after recording, the recorded user data and error correction data;

compare the read recorded user data and error correction data to the user data and error correction data stored in said another computer usable memory;

determine, from the comparison, a list of locations of error;

determine, for each error location in the list of error locations, a corresponding correct datum from the user data and error correction data stored in said another computer usable memory, a plurality of locations of error or and corresponding correction data constituting error or data; store the error data in said computer usable memory;

replace, after readback, at each one location from predetermined ones of the list of locations of error, the read recorded user data and error correction data with the correct datum corresponding to said one location from the predetermined ones;

wherein, after replacing, corrected retrieved user data and error correction data is obtained.

10. The data storage apparatus of claim 9 wherein said computer usable medium is further capable of causing said at least one processor to:

obtain error correction data corresponding to the error data;

wherein said computer usable medium in causing said at least one processor to store the error data causes said at least one processor to store, in said computer usable memory, the error data and the error correction data corresponding to the error data; and decode, at readback, using an error correction decoder, corrected error data from the error data and the error correction data corresponding to the error data.

11. The data storage apparatus of claim 9 wherein said computer usable medium is further capable of causing said at least one processor to:

determine whether said computer usable memory has substantially reached full capacity for a predetermined error data block;

record, if said computer usable memory has substantially reached full capacity for a predetermined error data block, said predetermined error or data block to a predetermined location in a recording medium; and clear said predetermined error data block from said computer usable memory.

* * * * *

UNITED STATES PATENT AND TRADEMARK OFFICE
CERTIFICATE OF CORRECTION

| | | |
|---|---|---|
| PATENT NO. | : 7,814,395 B2 | Page 1 of 1 |
| APPLICATION NO. | : 11/565991 | |
| DATED | : October 12, 2010 | |
| INVENTOR(S) | : Marinus J. Monen and Maarten R. de Haan | |

It is certified that error appears in the above-identified patent and that said Letters Patent is hereby corrected as shown below:

In column 11, line 8 (claim 2) "error data" should read -- error data. --

In column 14, line 9 (claim 11) "block, said predetermined error or data block to a pre-" should read -- block, said predetermined error data block to a pre- --

Signed and Sealed this

Eighteenth Day of October, 2011

David J. Kappos
*Director of the United States Patent and Trademark Office*